United States Patent
Sohn et al.

(10) Patent No.: US 12,419,477 B2
(45) Date of Patent: Sep. 23, 2025

(54) ROBOT CLEANER

(71) Applicants: LG ELECTRONICS INC., Seoul (KR); MAKITA CORPORATION, Aichi (JP)

(72) Inventors: Byungkon Sohn, Seoul (KR); Kentaro Koura, Aichi (JP); Youngkouk Song, Seoul (KR)

(73) Assignees: LG ELECTRONICS INC., Seoul (KR); MAKITA CORPORATION, Anjo (JP)

( * ) Notice: Subject to any disclaimer, the term of this patent is extended or adjusted under 35 U.S.C. 154(b) by 588 days.

(21) Appl. No.: 17/593,795

(22) PCT Filed: Mar. 6, 2020

(86) PCT No.: PCT/KR2020/003159
§ 371 (c)(1),
(2) Date: Sep. 24, 2021

(87) PCT Pub. No.: WO2020/197123
PCT Pub. Date: Oct. 1, 2020

(65) Prior Publication Data
US 2022/0167815 A1     Jun. 2, 2022

(30) Foreign Application Priority Data
Mar. 26, 2019    (KR) .................. 10-2019-0034536

(51) Int. Cl.
*A47L 9/28*      (2006.01)
*A47L 9/00*      (2006.01)
(Continued)

(52) U.S. Cl.
CPC ............. *A47L 9/2852* (2013.01); *A47L 9/009* (2013.01); *A47L 9/2805* (2013.01);
(Continued)

(58) Field of Classification Search
CPC ............. A47L 2201/04; A47L 2201/06; A47L 9/2852; A47L 9/19; A47L 9/2826;
(Continued)

(56) References Cited

U.S. PATENT DOCUMENTS

| 6,459,955 B1 | 10/2002 | Bartsch et al. |
| 2005/0021181 A1 | 1/2005 | Kim et al. |

(Continued)

FOREIGN PATENT DOCUMENTS

| CN | 105249887 A | 1/2016 |
| CN | 105425793 A | 3/2016 |

(Continued)

OTHER PUBLICATIONS

Office Action of Korean Patent Application No. 10-2019-0034536 dated Jan. 23, 2020 (5 pages).

(Continued)

*Primary Examiner* — Katina N. Henson
*Assistant Examiner* — Sharonda T Felton
(74) *Attorney, Agent, or Firm* — Birch, Stewart, Kolasch & Birch, LLP

(57) ABSTRACT

The present disclosure provides a robot cleaner comprising: a cleaner body including a control unit for controlling autonomous travelling; a sensing unit arranged to be inclined to the side surfaces and the upper surface of an upper corner portion of the cleaner body and photographing both the side direction and the upper direction of the cleaner body; and a bumper arranged to cover a first half area of the cleaner body and configured, at the time of coming into contact with an obstacle, to be pressed and absorb impact, wherein the sensing unit is arranged behind the bumper.

17 Claims, 8 Drawing Sheets

(51) Int. Cl.
G05D 1/00 (2024.01)
H04N 23/90 (2023.01)

(52) U.S. Cl.
CPC ........... G05D 1/0227 (2013.01); H04N 23/90 (2023.01); *A47L 2201/04* (2013.01)

(58) Field of Classification Search
CPC ..... A47L 9/2831; A47L 9/009; G01B 11/026; G01S 17/931
See application file for complete search history.

(56) References Cited

U.S. PATENT DOCUMENTS

| | | | |
|---|---|---|---|
| 2005/0217042 A1* | 10/2005 | Reindle | A47L 11/24 15/52.1 |
| 2016/0059770 A1* | 3/2016 | Ji | H04N 23/56 901/1 |
| 2016/0144505 A1 | 5/2016 | Fong et al. | |
| 2016/0166127 A1 | 6/2016 | Lewis | |
| 2016/0202703 A1* | 7/2016 | Matsubara | B08B 13/00 701/24 |
| 2016/0302639 A1 | 10/2016 | Lindhé et al. | |
| 2017/0231447 A1* | 8/2017 | Izawa | A47L 9/009 15/319 |
| 2017/0329333 A1* | 11/2017 | Passot | A47L 11/4061 |
| 2017/0332857 A1* | 11/2017 | Nam | G05D 1/0248 |
| 2019/0202064 A1* | 7/2019 | Wolff | H02J 7/0042 |
| 2019/0298137 A1* | 10/2019 | Zhu | A47L 11/4041 |
| 2020/0331148 A1 | 10/2020 | Zhang et al. | |

FOREIGN PATENT DOCUMENTS

| | | | |
|---|---|---|---|
| CN | 105982820 | A | 10/2016 |
| CN | 108575123 | A | 4/2017 |
| CN | 207424680 | U | 5/2018 |
| CN | 108247647 | A | 7/2018 |
| CN | 212234313 | U | 12/2020 |
| EP | 2482024 | A2 | 8/2012 |
| JP | 2003-323214 | A | 11/2003 |
| JP | 2006-43175 | A | 2/2006 |
| JP | 2007-37713 | A | 2/2007 |
| JP | 2007-179398 | A | 7/2007 |
| JP | 2011-233149 | A | 11/2011 |
| JP | 2014-079513 | A | 5/2014 |
| JP | 2016-51343 | A | 4/2016 |
| JP | 2018-182732 | A | 11/2018 |
| JP | 2019-505923 | A | 2/2019 |
| JP | 2019-516508 | A | 6/2019 |
| KR | 10-0738888 | B1 | 7/2007 |
| KR | 10-2017-0033374 | A | 3/2017 |
| KR | 10-2017-0047381 | A | 5/2017 |
| KR | 10-2017-0131172 | A | 11/2017 |
| KR | 10-2017-0131198 | A | 11/2017 |
| KR | 10-2018-0025097 | A | 3/2018 |
| KR | 10-1949279 | B1 | 2/2019 |
| WO | WO 2016/027719 | A1 | 2/2016 |
| WO | WO 2017/200350 | A1 | 11/2017 |

OTHER PUBLICATIONS

Final Office Action of Korean Patent Application No. KR 10-2019-0034536 dated Jul. 28, 2020 (3 pages).
Notice of Allowance of Korean Patent Application No. KR 10-2019-0034536 dated Oct. 15, 2020 (2 pages).

* cited by examiner

ROBOT CLEANER

CROSS-REFERENCE TO RELATED APPLICATIONS

This application is the National Stage filing under 35 U.S.C. 371 of International Application No. PCT/KR2020/003159, filed on Mar. 6, 2020, which claims the benefit of earlier filing date and right of priority to Korean Application No. 10-2019-0034536, filed on Mar. 26, 2019, the contents of which are all hereby incorporated by reference herein in their entirety.

TECHNICAL FIELD

The present disclosure relates to a robot cleaner that performs a function of cleaning a floor while traveling on its own in a predetermined area.

BACKGROUND

In general, a robot cleaner recognizes a surrounding environment on its own and performs a cleaning function suitable for the environment while autonomously traveling in a predetermined area. A typical cleaning function performed by a robot cleaner may include a function of suctioning and removing dust or foreign substances existing in a floor area. In addition, robot cleaners may be used in various environments such as warehouses, homes, and offices.

Meanwhile, autonomous driving (autonomous travel), which is one of core technologies of a robot cleaner, can be achieved as the robot cleaner accurately recognizes its current location in an environment in which the robot cleaner works.

In general, a robot cleaner may recognize its current location based on map information which is created by performing a Simultaneous Localization And Map-Building (SLAM) task using information obtained through various sensors. A robot cleaner also performs a function of capturing and monitoring the inside of a house by using autonomous driving characteristics.

Accordingly, as disclosed in Korean Laid-open Publication No. 10-2017-0131172 (Nov. 29, 2017), various attempts are made to apply various sensors having different functions for more precise implementation of an autonomous driving function of a robot cleaner. According to these attempts, the number of sensors applied to the robot cleaner is also increasing.

At the same time, in order to further improve an autonomous driving performance of robot cleaners, researches on the optimized design of various sensors applied to robot cleaners are being conducted.

SUMMARY

Technical Problem

An aspect of the present disclosure is to provide an optimized arrangement structure of a sensing unit that is applied to implement autonomous driving of a robot cleaner and functions using autonomous driving characteristics of the robot cleaner.

Technical Solution

In order to achieve the aspect of the present disclosure, there is provided a robot cleaner that may include a cleaner body including a control unit for controlling autonomous driving, a sensing unit disposed in an upper edge portion of the cleaner body to be inclined with respect to a side surface and an upper surface of the cleaner body, so as to capture a side direction and an upper direction of the cleaner body, and a bumper disposed to cover at least part of a first half area of the cleaner body, and configured, at the time of coming into contact with an obstacle, to be pressed and absorb impact, wherein the sensing unit may be disposed behind the bumper.

The sensing unit may be disposed at a position adjacent to the bumper in a rear area of the bumper.

The robot cleaner may further include an inclined part formed on the upper edge portion of the cleaner body to be downwardly inclined with respect to the upper surface of the cleaner body, and having a through portion configured to allow capturing of the sensing unit. An inclination of the sensing unit may be smaller than an inclination of the inclined part, such that an optical axis of the sensing unit is directed upward rather than a central axis of the through portion.

The sensing unit may have an inclination ranging from 25° to 35° with respect to a ground.

The sensing unit may include a first camera part and a second camera part disposed in one side and another side of the upper edge portion of the cleaner body in an inclined manner, to capture the side direction and the upper direction of the cleaner body.

The first camera part may include a first camera, a first window disposed to cover the first camera, and a first case mounted to the cleaner body to fix the first camera and the first window, the first case defining a hermetic space together with the first window to seal the first camera, and the second camera part may include a second camera, a second window disposed to cover the second camera, and a second case mounted to the cleaner body to fix the second camera and the second window, the second case defining a hermetic space together with the second window to seal the second camera.

The first window and the second window may include a first filter and a second filter, respectively, to selectively transmit an infrared area.

The first camera part and the second camera part may be disposed at symmetrical positions in a left and right direction based on a front center line of the cleaner body.

The control unit may detect a current position in a traveling area using images captured by the first and second camera parts.

The first and second camera parts may be rotatable, respectively, to adjust an optical axis.

The robot cleaner may further include an ultrasonic sensing unit disposed on one surface of a front side of the bumper to detect an obstacle located around the front of the cleaner body using ultrasonic waves reflected after being emitted to a surrounding of the front of the cleaner body.

The bumper may be disposed to cover at least part of the side surface and the upper surface of the cleaner body in a front area of the cleaner body.

The sensing unit may have a range capable of capturing an image including a ceiling.

Meanwhile, to achieve the aspect of the present disclosure, there is provided a robot cleaner that may include a cleaner body including a control unit for controlling autonomous driving, a sensing unit disposed in an upper edge portion of the cleaner body to be inclined with respect to a side surface and an upper surface of the cleaner body, so as to capture a side direction and an upper direction of the cleaner body, and a bumper disposed to cover at least part of a first half area of the cleaner body, and configured, at the time of coming into contact with an obstacle, to be pressed and absorb impact. The sensing unit may be disposed at a first height, at which the bumper is located, from a ground of the cleaner body or at a second height lower than the first height.

The control unit may detect a current position in a traveling area using images captured by the sensing unit.

Advantageous Effects

The effects of the present disclosure obtained by the aforementioned solutions are as follows.

First, a bumper that absorbs an impact by being pressed when a robot cleaner comes into contact with an obstacle may be disposed to cover a first half area of a cleaner body, and a sensing unit for capturing both a side direction and an upper direction of the cleaner body may be disposed behind the bumper. Accordingly, a function of avoiding a direct collision with an obstacle during traveling of the robot cleaner can be provided by the structure of the bumper and simultaneously image information related to a side direction with respect to a traveling direction of the robot cleaner and an upper area of a side portion can be more effectively obtained, thereby facilitating a sampling operation of the image information even in a narrow and long hallway structure such as an office or in an environment with a high ceiling. As a result, reliability and accuracy of information acquired through the sensing unit and information created by using the acquired information can be provided.

In addition, within a limited space defined in the cleaner body, a more efficient arrangement structure of the sensing unit and the bumper required for implementing autonomous driving of the robot cleaner can be provided.

Second, a bumper that absorbs an impact by being pressed when the robot cleaner comes into contact with an obstacle may be disposed to cover a first half area of the cleaner body and the sensing unit for sensing both a side direction and an upper direction of the cleaner body may be disposed at the same height as a height at which the bumper is located, so as to capture images for an upper side of the robot cleaner more accurately. This may result in more improving an autonomous driving function of the robot cleaner.

DETAILED DESCRIPTION

Hereinafter, a robot cleaner according to the present disclosure will be described in detail with reference to the accompanying drawings.

Figure 1:
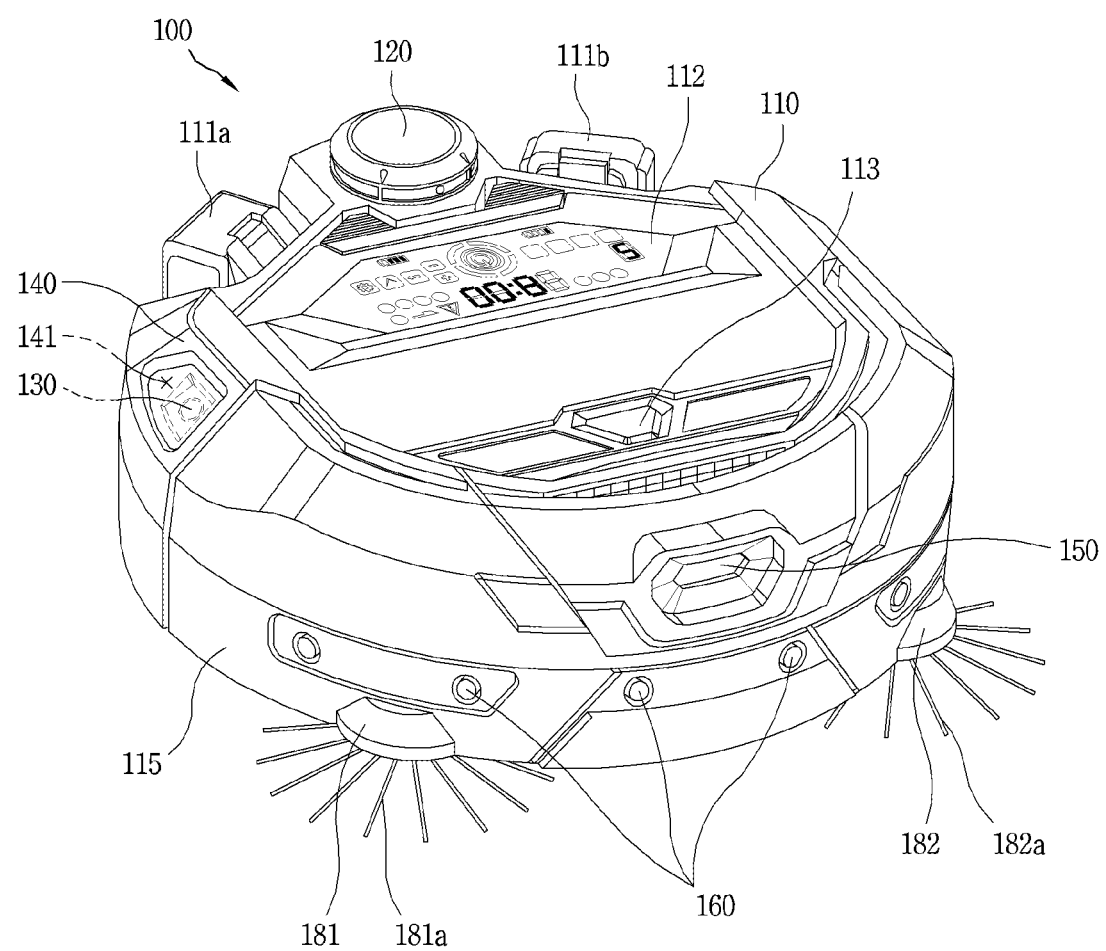
FIG. 1 is a perspective view illustrating one example of a robot cleaner in accordance with the present disclosure.
Figure 2:
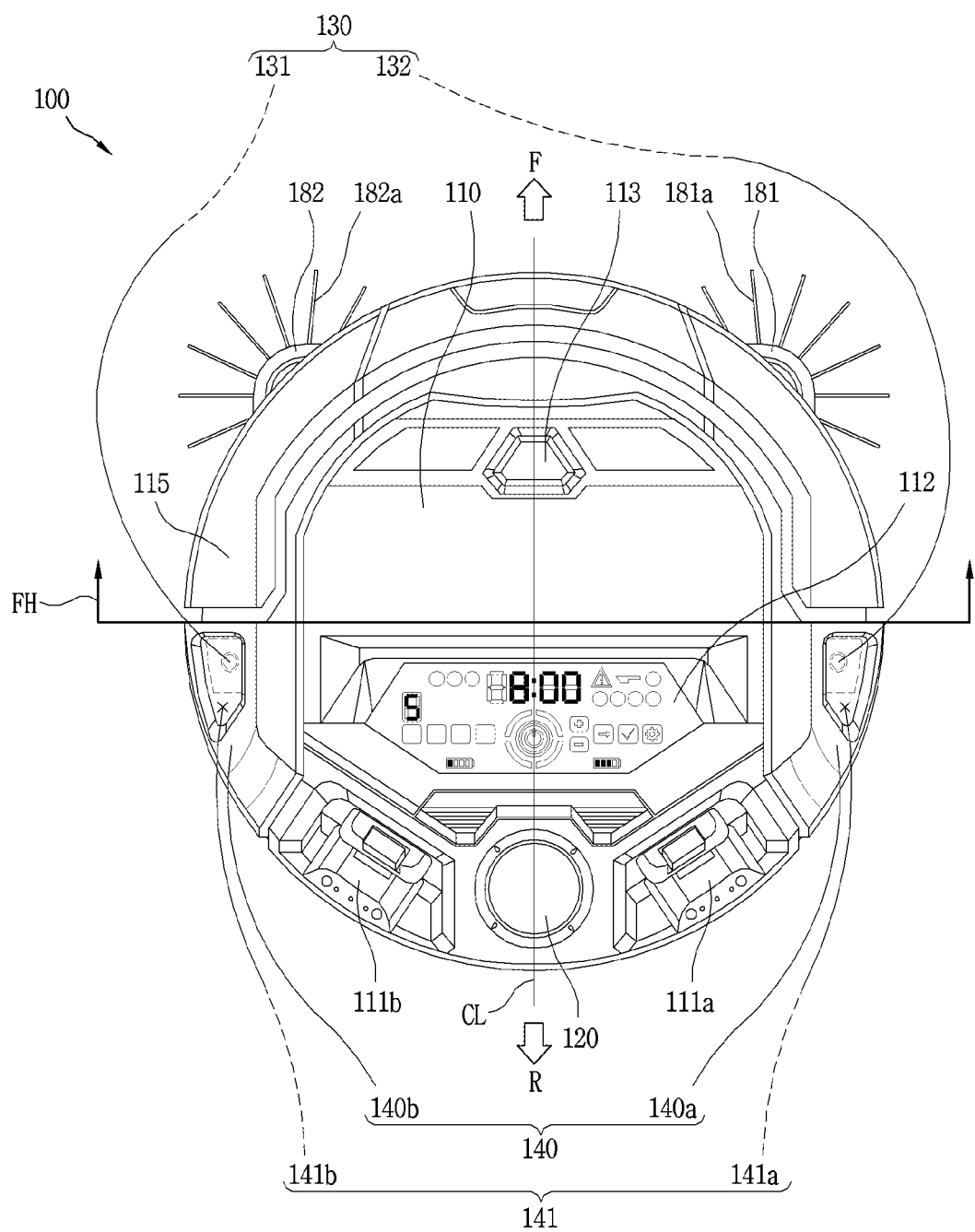
FIG. 2 is a planar view of the robot cleaner illustrated in FIG. 1.
Figure 3:
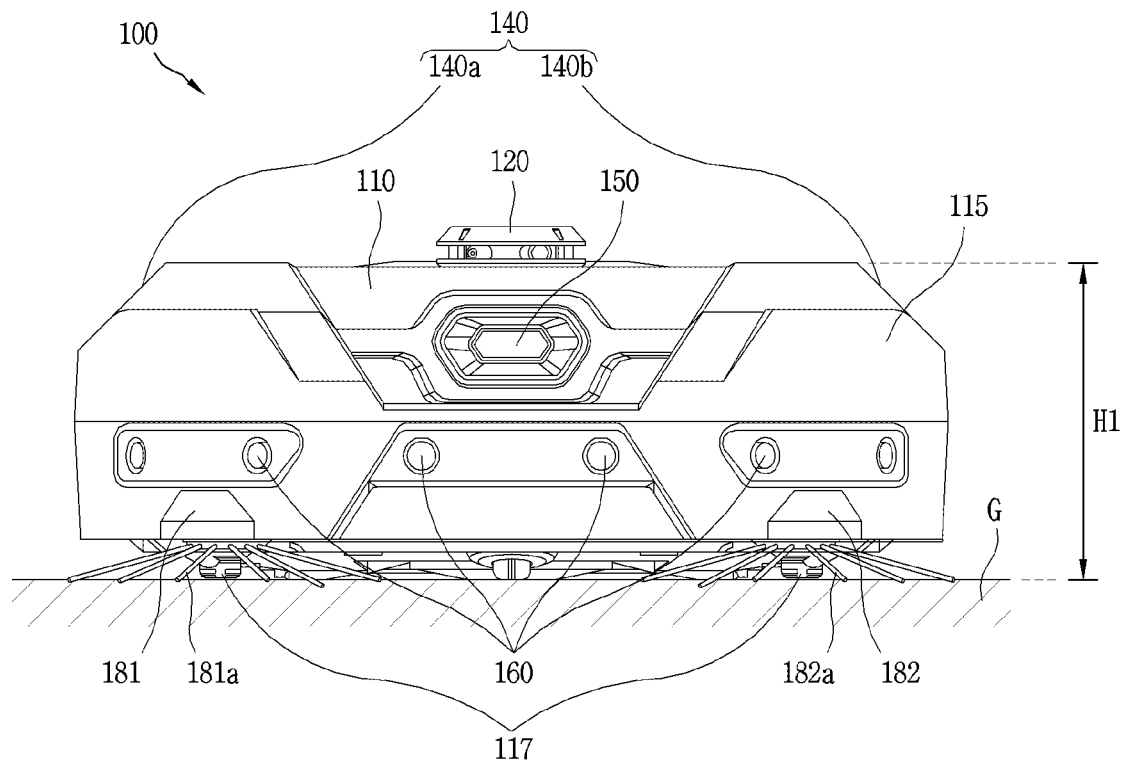
FIG. 3 is a front view of the robot cleaner illustrated in FIG. 1.

FIG. 1 is a perspective view illustrating one example of a robot cleaner 100 according to the present disclosure, FIG. 2 is a planar view of the robot cleaner 100 illustrated in FIG. 1, and FIG. 3 is a front view of the robot cleaner 100 illustrated in FIG. 1.

Referring to FIGS. 1 to 3, the robot cleaner 100 may recognize a surrounding environment on its own and perform a cleaning function suitable for the environment while traveling in a predetermined area. The cleaning function mentioned herein may include a function of suctioning and removing dust or foreign substances existing in the floor area. In addition, the robot cleaner 100 may be used in various environments such as warehouses, homes, and offices.

The robot cleaner 100 may include a cleaner body 110, a sensing unit 130, and a bumper 115.

The cleaner body 110 may include a control unit (not shown) for controlling autonomous driving (or autonomous traveling) of the robot cleaner 100. In addition, the cleaner body 110 may include a wheel unit 117 for traveling of the robot cleaner 100. The robot cleaner 100 may be moved on the ground G by the wheel unit 117.

The wheel unit 117 may be disposed on a lower portion of the cleaner body 110 to come in contact with the ground G and may be rotatable centering on a shaft perpendicular to the cleaner body 110 for switching a moving direction of the robot cleaner 100. The wheel unit 117 may be provided in plurality on the cleaner body 110 to be operated independently.

Meanwhile, a first battery 111a and a second battery 111b supplying power for operating the robot cleaner 100 may be coupled to the cleaner body 110. The first and second batteries 111a and 111b may be detachable from the cleaner body 110 to be recharged separately, or may be recharged while being mounted to the cleaner body 110.

In addition, a display 112 may be disposed on an upper surface of the cleaner body 110 to display various status information related to the operation of the robot cleaner 100 and provide it to the user. The status information may include various pieces of information, such as a power-on/off state, a cleaning state, a cleaning mode, an operation time, and whether or not there is a failure. The cleaning mode may include a mode for the robot cleaner 100 to clean a space, such as a warehouse or a long hallway, without many obstacles while traveling along a predetermined pattern, and a mode for the robot cleaner 100 to clean a space, such as an office, with many obstacles while autonomously traveling in the space without following a predetermined pattern.

In addition, a lamp 113 that displays the state of the robot cleaner 110 in another form together with the display 112 may be disposed on the upper surface of the cleaner body 110. The lamp 113 may be configured to emit light of various colors in various ways.

For example, the lamp 113 may display light by differentiating colors, brightness of light, flickering shapes, and the like. Accordingly, even in a situation in which it is difficult for a user to check the status information of the robot cleaner 100 through the display 112, the user can obtain the status information of the robot cleaner 100 more intuitively through light emitted from the lamp 113. Also, in the present disclosure, a case in which one lamp 113 is provided has been described as an example, but the lamp 113 may alternatively be provided in plurality disposed adjacent to each other.

Figure 4:
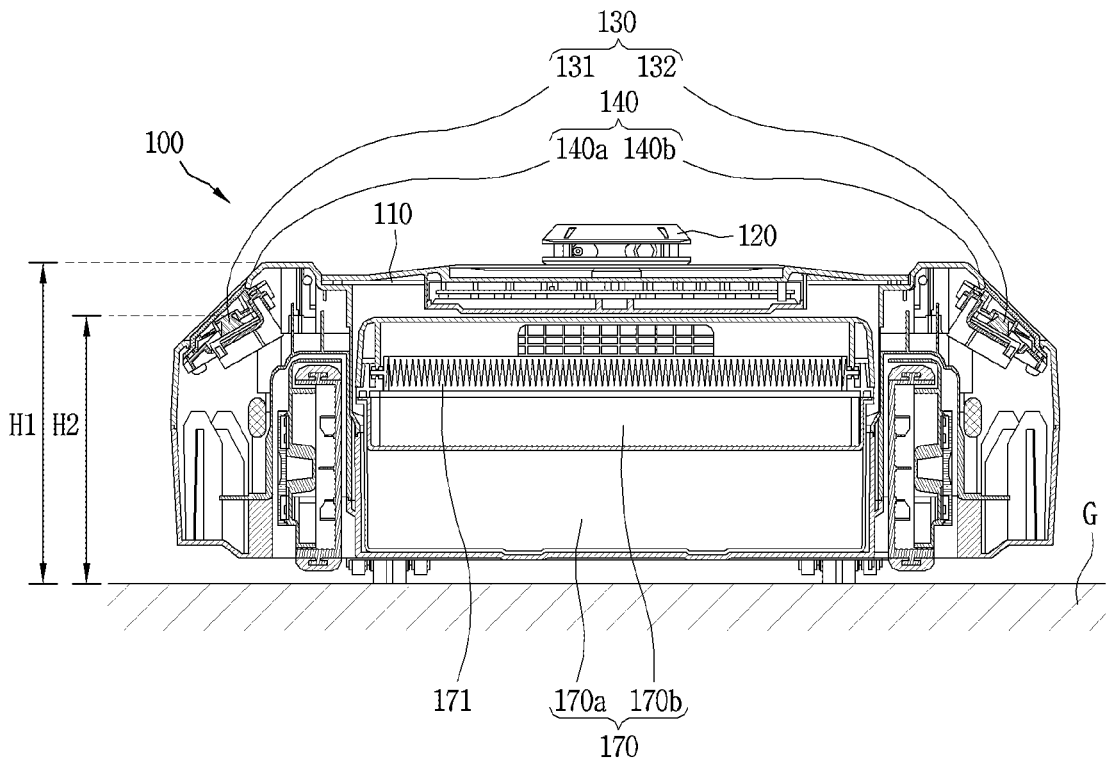
FIG. 4 is a cross-sectional view of the robot cleaner illustrated in FIG. 3.

The sensing unit 130 may be disposed at an upper edge (corner) portion of the cleaner body 110 to be inclined with respect to each of a side surface and an upper surface of the cleaner body 110, to capture a side direction and an upper direction of the cleaner body 110. For example, the sensing unit 130 may be implemented as a typical capturing camera. In addition, the sensing unit 130 may be disposed at the rear of the bumper 115 as illustrated in FIG. 2. The sensing unit 130 may have an inclination in the range of 25° to 35° with respect to the ground. On the other hand, the sensing unit 130 may be disposed at a first height H1, at which the bumper 115 is located, from the lower surface of the cleaner body 110, or at a second height H2 lower than the first height H1. For example, the sensing unit 130, as illustrated in FIGS. 3 and 4, may be disposed at the second height H2 that is lower than and close to the first height H1 at which the bumper 115 is located. According to this structure, the bumper 115 can surround the front surface of the cleaner body 110 so as to expand a range of protecting the robot cleaner 100 from obstacles, while expecting to improve an obstacle detection function using a detection function of the bumper 115 itself.

In addition, by arranging the sensing unit 130 at the highest position within the range of the first height H1, reliability of an image sampling operation through the sensing unit 130 can be enhanced. In addition, since the sensing unit 130 is located within the range of the first height H1, the sensing unit 130 can be more safely protected from an impact caused by a collision.

On the other hand, the robot cleaner 100 may have appearance in a cylindrical shape, and include an inclined part 140 formed between an upper surface and a side surface of the cleaner body 110 to be described later, so as to be prevented from being jammed due to an obstacle located at an upper side of the robot cleaner 100. Here, the bumper 115 may be formed to be inclined along the inclined part 140 to prevent the robot cleaner 100 from being jammed due to an obstacle.

According to the configuration of the sensing unit 130 as described above, a new form factor for the camera configuration of the robot cleaner 100 can be provided, and a capturing area for the surrounding environment of the cleaner body 110 can be further expanded. In addition, image information related to a side direction (side portion, side area) with respect to a traveling direction of the robot cleaner 100 and an upper area of the side portion (side area) can be acquired more effectively. This may facilitate a sampling operation of the image information even in a narrow and long hallway structure such as an office or in a cleaning environment with a high ceiling.

The bumper 115 may be disposed to cover at least part of a first half (FH) area of the cleaner body 110. The first half (FH) means a front half of the whole divided in two. For example, as illustrated in FIG. 2, the bumper 115 may be disposed to cover at least part of a side surface and an upper surface of the cleaner body 110 in the first half (FH) area of the cleaner body 110.

The bumper 115 may have a structure in which one surface of the bumper 115 is made of an elastically deformable material to absorb an impact caused when the robot cleaner 100 collides with an obstacle during traveling or that is restored to an original state after pressed due to the collision. Accordingly, the robot cleaner 100 can have more improved durability by virtue of absorbing an impact caused by a collision with an obstacle during traveling. In addition, the bumper 115 may detect an impact caused due to collision with an obstacle.

Here, the sensing unit 130 may be disposed behind the bumper 115. For example, the sensing unit 130 may be disposed at a position adjacent to the bumper 115 in a rear area of the bumper 115 excluding a portion where the bumper 115 is formed on the cleaner body 110.

Meanwhile, the robot cleaner 100 may further include an ultrasonic sensing unit 160.

The ultrasonic sensing unit 160 may be disposed on one surface of a front side of the bumper 115, to detect a distance from an obstacle and a direction in which the obstacle is located by transmitting ultrasonic waves to the front of the cleaner body 110 and receiving reflected ultrasonic waves. On the other hand, the ultrasonic sensing unit 160 may be disposed to be lower than the sensing unit 130 in an up-and-down direction of the cleaner body 110.

In addition, a front camera 150 may be disposed on a front side of the robot cleaner to face the front of the robot cleaner 100, so as to capture the front side of the robot cleaner 100. On the other hand, the front of the robot cleaner 100 means a side that the cleaner body 110 travels forward (F), namely, the front side of the cleaner body 110, and the rear [opposite (rearward R) to forward (F)] of the robot cleaner 100 means the rear side of the cleaner body 110.

In addition, a first side brush 181 and a second side brush 182 may be provided on both sides of a lower portion of the cleaner body 110, respectively. The first and second side brushes 181 and 182 may be configured to be rotatable centering on an axis perpendicular to the robot cleaner 100, and perform a function of sweeping foreign substances present on the ground G of an outer area of the robot cleaner 100 into a suction device of the robot cleaner 100. A plurality of first brushes 181*a* and second brushes 182*a* may be disposed respectively on outer circumferential surfaces of the first and second side brushes 181 and 182 to separate the foreign substances from the ground G.

Meanwhile, the robot cleaner 100 may further include an upper sensing unit 120.

The upper sensing unit 120 may protrude from the upper surface of the cleaner body 110 by a predetermined height. The upper sensing unit 120 may irradiate a laser to the surrounding of the cleaner body 110 to detect an obstacle such as a wall located around the cleaner body 110 in a traveling state or a stopped state of the robot cleaner 100. For example, the upper sensing unit 120 may be configured as a LiDAR. The LiDAR is a device that measures a distance to a target object at the surrounding by emitting a pulsed laser (laser-pulsed) and receiving reflected light from the target object, so as to accurately draw out the surrounding.

Meanwhile, the robot cleaner 100 may further include an inclined part 140.

The inclined part 140 may be formed at an upper edge portion of the cleaner body 110 to be inclined downward with respect to the upper surface of the cleaner body 110, and include a through portion 141 for capturing of the sensing unit 130. Here, the sensing unit 130 may be disposed inside the inclined part 140, to capture a surrounding area of the cleaner body 110 through a through area of the through portion 141.

Hereinafter, the characteristics of the sensing unit 130 and the inclined part 140 will be described with reference to FIGS. 4 and 5 along with FIGS. 1 to 3.

Figure 5:
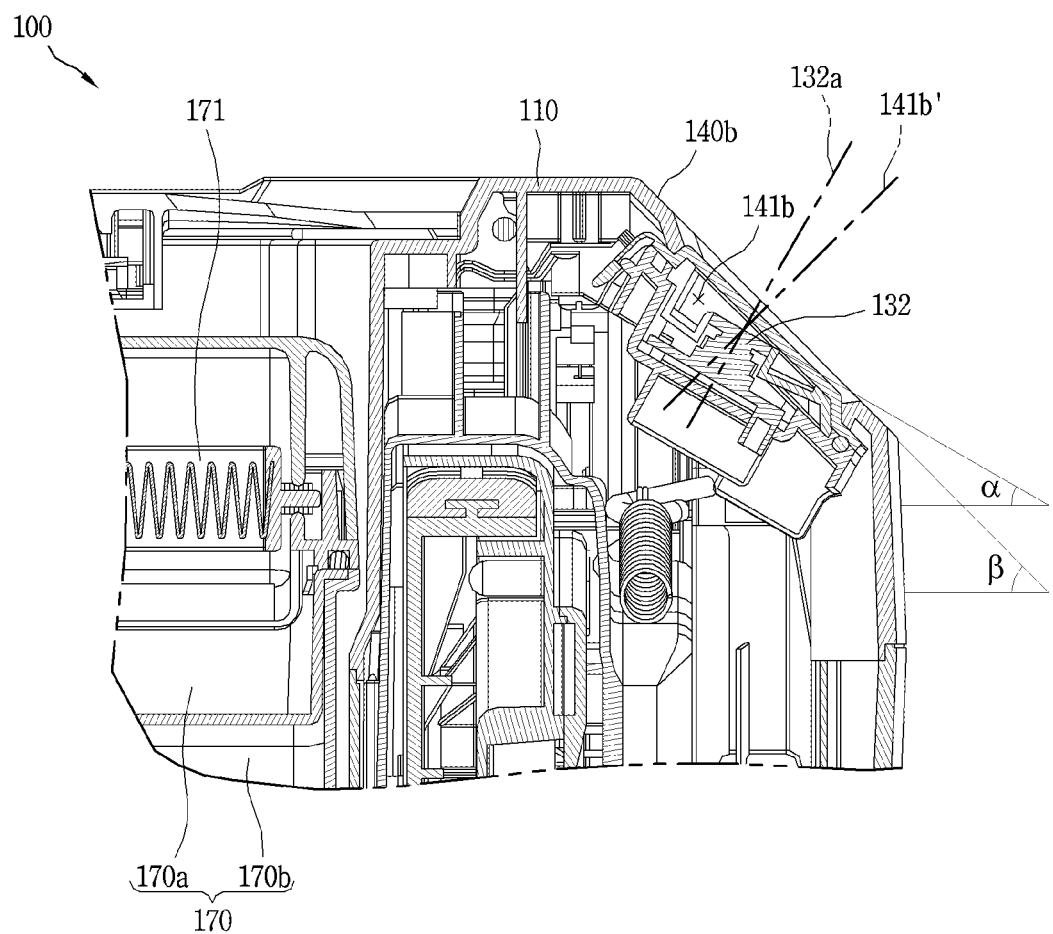
FIG. 5 is an enlarged cross-sectional view illustrating a sensing unit in the robot cleaner illustrated in FIG. 4.

FIG. 4 is a cross-sectional view of the robot cleaner 100 illustrated in FIG. 3, and FIG. 5 is an enlarged cross-sectional view illustrating the sensing unit 130 in the robot cleaner 100 illustrated in FIG. 4.

As illustrated in FIGS. 1 to 5, the sensing unit 130 may include a first camera part 131 and a second camera part 132.

As illustrated in FIG. 4, a dust box 170 for accommodating foreign substances collected into the cleaner body 110 through the suction device of the robot cleaner 100 may be disposed in the cleaner body 110. The dust box 170 may include a first accommodating portion 170a and a second accommodating portion 170b that are partitioned to collect foreign substances having relatively large particles and foreign substances having relatively small particles, respectively. A dust filter 171 for filtering foreign substances or dust in air discharged to the outside of the dust box 170 may be mounted to an upper portion of the dust box 170.

The first camera part 131 and the second camera part 132 may be disposed in one side and another side of an upper edge area of the cleaner body 110, respectively, in an inclined manner, so as to capture the side direction and the upper direction of the cleaner body 110. The first camera part 131 and the second camera part 132, as illustrated in FIG. 2, may be disposed at symmetrical positions in a left and right direction based on a front center line CL of the cleaner body 110. Accordingly, the surrounding environment of the cleaner body 110 including a wider area can be captured through the first and second camera parts 131 and 132, and thus an amount of information obtained from images captured through the first and second camera parts 131 and 132 can be more increased.

The inclined part 140 may include a first inclined surface 140a and a second inclined surface 140b formed on one side and another side of the cleaner body 110 to correspond to the configuration of the first and second camera parts 131 and 132. In addition, to correspond to the first inclined surface 140a and the second inclined surface 140b, the through portion 141 may include a first through hole 141a and a second through hole 141b through which the first camera part 131 and the second camera part 132 capture images, respectively.

In addition, the control unit may be configured to detect a current position of the robot cleaner 100 in a traveling area by using the images captured through the first and second camera parts 131 and 132. The position of the robot cleaner 100 can be detected based on map information which is created by performing a SLAM task using image information acquired through the first and second cameras 131 and 132.

Here, an inclination of the sensing unit 130 may be set to be smaller than that of the inclined part 140, such that an optical axis of the sensing unit 130 is directed more upward than a central axis of the through portion 141. The characteristics of the sensing unit 130 and the inclined part 140 will be exemplarily described based on the second camera part 132 and the second inclined surface 140b, with reference to FIG. 5. An inclination α of the second camera part 132 may be smaller than an inclination β of the second inclined surface 140b, such that an optical axis 132a of the second camera part 132, namely, a reference line for a direction and position of a light beam when examining the progress of the light beam in an optical system, can be directed upward of the robot cleaner 100 rather than a central axis 141b' of the second through hole 141b. For example, when the inclination β of the second inclined surface 140b is 45°, the inclination α of the second camera part 132 may be 30°.

Hereinafter, the characteristics of the sensing unit 130 will be described in detail with reference to FIGS. 6 to 8.

Figure 6:
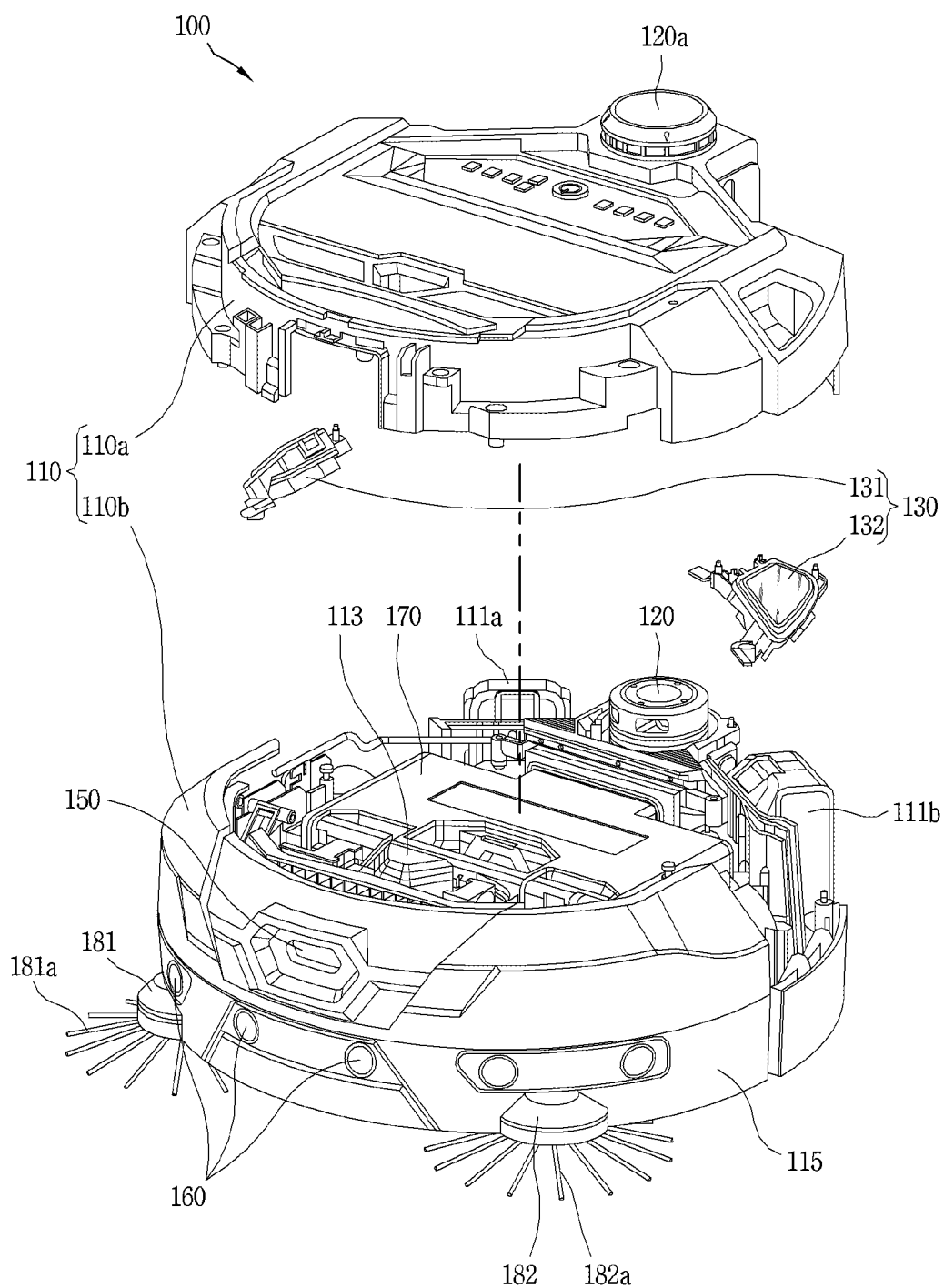
FIG. 6 is an exploded perspective view of the robot cleaner illustrated in FIG. 1.
Figure 7:
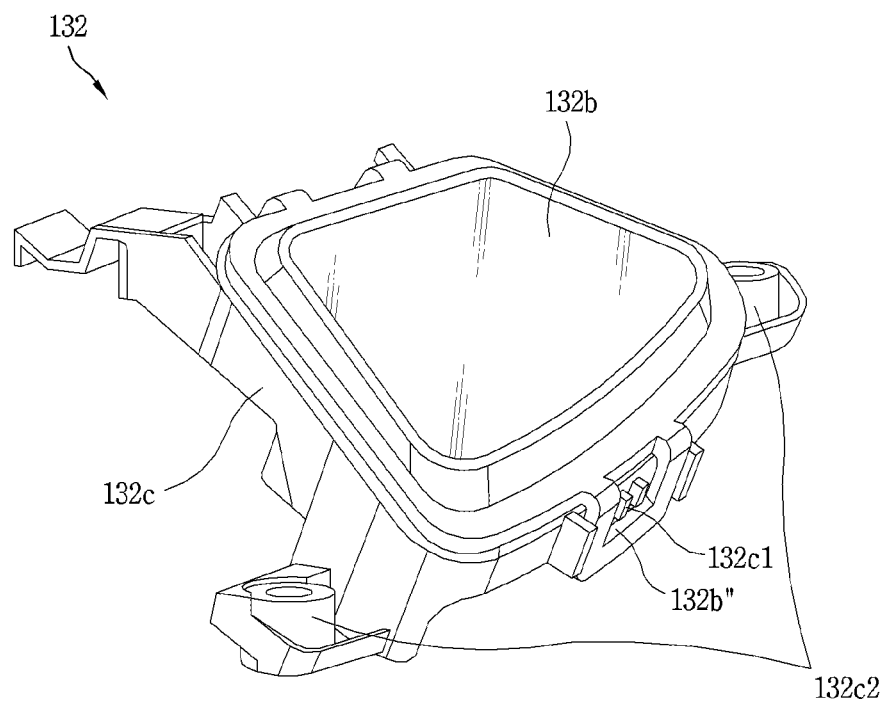
FIG. 7 is an exploded view illustrating the sensing unit in the robot cleaner illustrated in FIG. 6.
Figure 8:
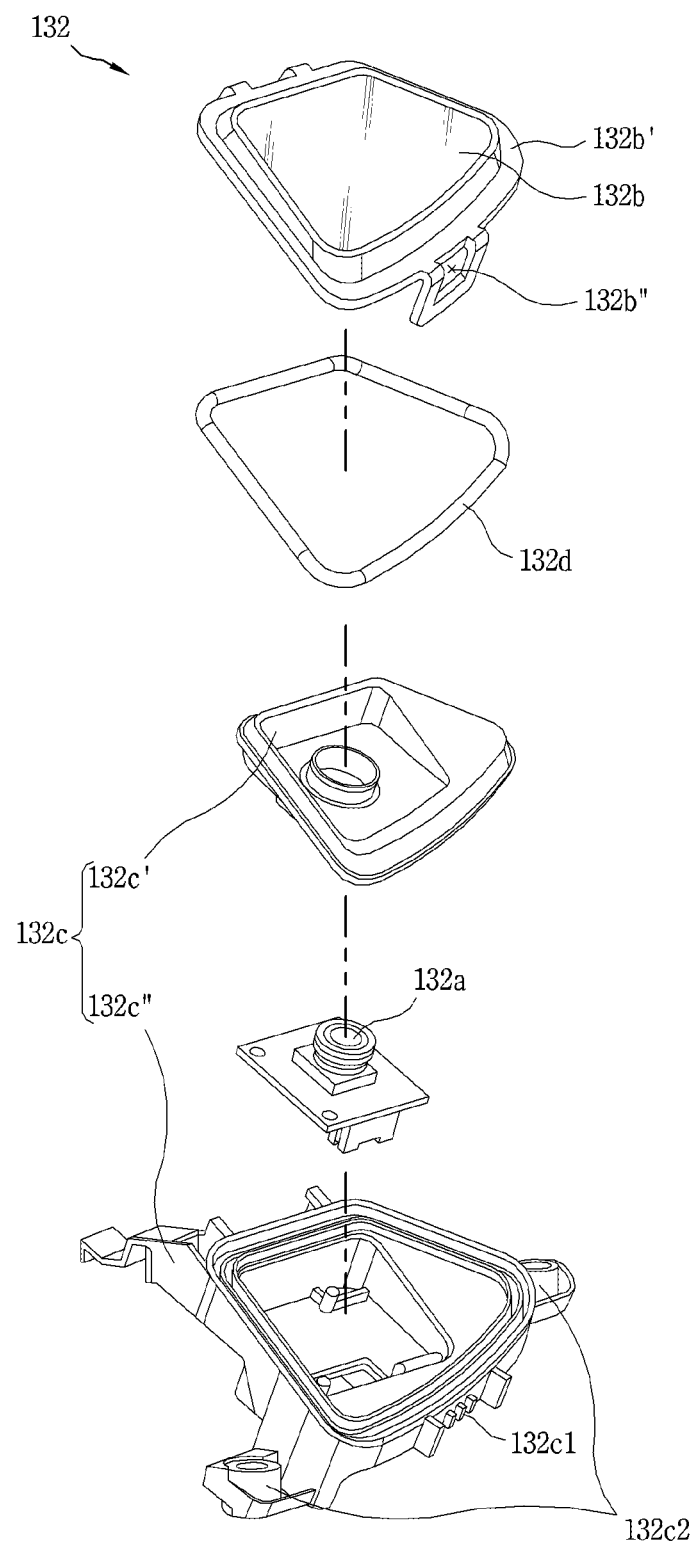
FIG. 8 is an exploded perspective view of the sensing unit illustrated in FIG. 7.

FIG. 6 is an exploded perspective view of the robot cleaner 100 illustrated in FIG. 1, FIG. 7 is an exploded view illustrating the sensing unit 130 in the robot cleaner 100 illustrated in FIG. 6, and FIG. 8 is an exploded perspective view of the sensing unit 130 illustrated in FIG. 7.

As illustrated in FIGS. 6 to 8, the cleaner body 110 may include an upper case 110a and a lower case 110b. The upper case 110a and the lower case 110b may be coupled to each other to define an inner space for accommodating various parts provided for operating the robot cleaner 100.

Meanwhile, for the convenience of description, the detailed configuration of the first camera part 131 and the second camera part 132 will be described exemplarily based on the second camera part 132. The description of the second camera part 132 to be described below will be equally applied to the first camera part 131.

The second camera part 132 may include a second camera 132a, a second window 132b, and a second case 132c.

The second camera 132a may capture a surrounding environment of the cleaner body 110 through the second through hole 141b.

The second window 132b may be disposed to cover the second camera 132a and may cover the second through hole 141b while being mounted on the cleaner body 110. The first window and the second window 132b may include a first filter (not shown) and a second filter (not shown) through which an infrared area is selectively transmitted, to provide a predetermined part of image information related to the surrounding environment of the robot cleaner 100 even in a dark environment. The first and second filters may alternatively be disposed in the first camera provided in the first camera part 131 and the second camera provided in the second camera part 132, other than the first window and the second window 132b.

The second window 132b may be fixed to a second window case 132b' that is coupled to the second case 132c to be described later.

The second case 132c may be mounted to the cleaner body 110 to fix the second camera 132a and the second window 132b. The second case 132c may define a hermetic space together with the second window 132b to seal the second camera 132a. The second case 132c, as illustrated in FIG. 8, may include a second intermediate case 132c' and a second lower case 132c" that are coupled to each other with the second camera 132a interposed in a middle portion therebetween. A plurality of second fixing holes 132c2 for fixing the second camera part 132 to the cleaner body 110 may be formed on side portions of the second lower case 132c".

A second sealing member 132d may be disposed between the second window case 132b' and the second case 132c to define the hermetic space.

A coupling hole 132b" may be formed on at least one side of the second window case 132b', and a second hook 132c1 may be formed on the second case 132c to correspond to the coupling hole 132b".

Hereinafter, a phenomenon in which a laser 120a emitted from the upper sensing unit 120 is included in an image captured by the sensing unit 130 will be described with reference to FIGS. 9 and 10.

Figure 9:
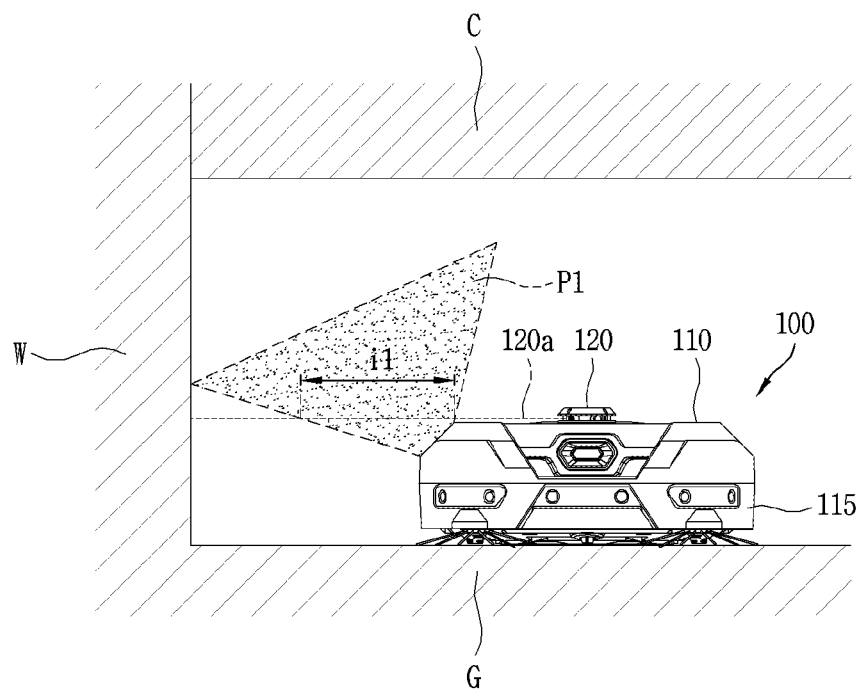
FIGS. 9 and 10 are views for comparing and explaining a phenomenon in which a laser emitted from an upper sensing unit illustrated in FIG. 1 is included in an image captured by the sensing unit.
Figure 10:
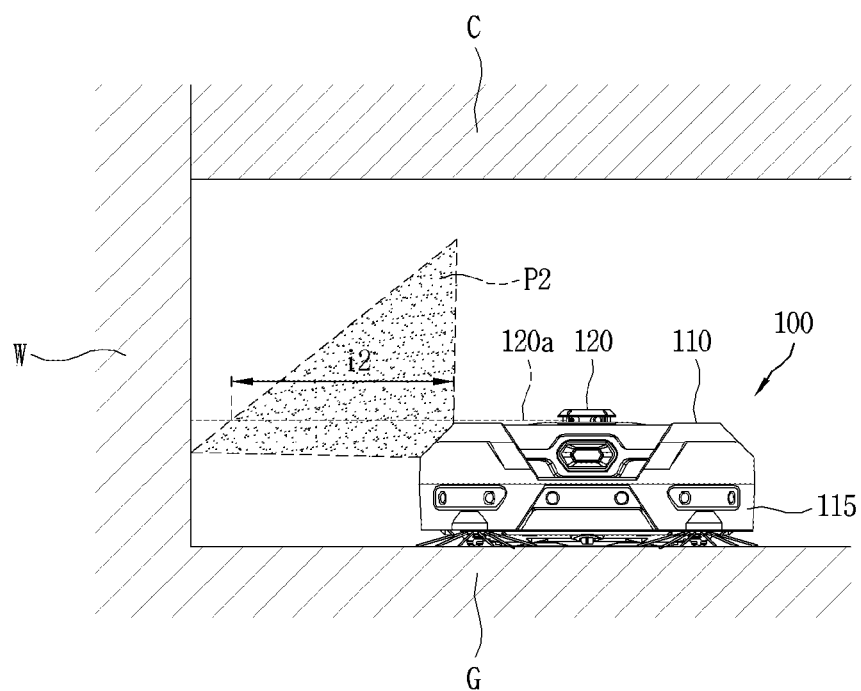

FIGS. 9 and 10 are views for comparing and explaining a phenomenon in which the laser 120a emitted from the upper sensing unit 120 illustrated in FIG. 1 is included in an image captured by the sensing unit 130.

FIG. 9 is a view illustrating an example in which the robot cleaner 100 according to the present disclosure is configured, as illustrated in FIG. 5, such that the inclination of the sensing unit 130 is smaller than that of the inclined part 140, while FIG. 10 is a view illustrating a comparative example, in which the sensing unit 130 and the inclined part 140 have the same inclination, to be compared with the robot cleaner 100 illustrated in FIG. 9.

Comparing FIGS. 9 and 10, it can be seen that a first interference area i1 including light of the laser 120a emitted from the upper sensing unit 120 in an image P1 captured by the sensing unit 130 of the robot cleaner 100 of FIG. 9 is smaller than a second interference area i2 including light of the laser 120a emitted from the upper sensing unit 120 in an image P2 captured by the sensing unit 130 of the robot cleaner 100 of FIG. 10. On the other hand, the sensing unit 130 may have a range for capturing an image including a ceiling C.

On the other hand, the first camera part 131 and the second camera part 132 may be rotatable, respectively, in order to adjust an optical axis. For example, the rotating operation of the first camera part 131 or the second camera part 132 may be realized by coupling the cleaner body 110 and the first camera part 131 or the second camera part 132 by a hinge.

INDUSTRIAL AVAILABILITY

The present disclosure can be used in industrial fields related to robot cleaners having an autonomous driving function.

The invention claimed is:

1. A robot cleaner comprising:
a cleaner body including a control unit for controlling autonomous driving;
a sensing unit disposed in an upper edge portion of the cleaner body, the sensing unit being inclined with respect to a side surface and an upper surface of the cleaner body;
an inclined part located on the upper edge portion of the cleaner body, the inclined part being downwardly inclined with respect to the upper surface of the cleaner body;
a bumper disposed to cover at least part of a first half area of the cleaner body including the inclined part of the first half area of the cleaner body, the bumper being configured to be pressed and to absorb impact; and
a front camera located at a front of the cleaner body, the front camera configured to face forward so as to take images toward a front side of the cleaner body,
wherein the sensing unit is located at a position adjacent to a rear area of the bumper and located on the inclined part excluding a portion where the bumper is disposed on the cleaner body,
wherein the sensing unit comprises a first camera part disposed in one side of the upper edge portion of the cleaner body at a first inclination and a second camera part disposed in another side of the upper edge portion of the cleaner body at a second inclination,
wherein the sensing unit is located at a first height from a ground on which the robot cleaner travels, the first height being a height equal to or less than a height at which the highest point of the bumper is located, and
wherein an inclination of the sensing unit is smaller than an inclination of the inclined part.

2. The robot cleaner of claim 1, wherein the inclined part comprises a through portion configured to allow capturing by the sensing unit.

3. The robot cleaner of claim 1, wherein the sensing unit has an inclination ranging from 25° to 35° with respect to a ground.

4. The robot cleaner of claim 1, wherein the first camera part comprises:
a first camera;
a first window disposed to cover the first camera; and
a first case mounted to the cleaner body to fix the first camera and the first window, the first case defining a hermetic space together with the first window to seal the first camera, and
wherein the second camera part comprises:
a second camera;
a second window disposed to cover the second camera; and
a second case mounted to the cleaner body to fix the second camera and the second window, the second case defining a hermetic space together with the second window to seal the second camera.

5. The robot cleaner of claim 4, wherein the first window comprises a first filter and the second window comprises a second filter, wherein the first filter and the second filter are configured to selectively transmit an infrared area.

6. The robot cleaner of claim 1, wherein the first camera part is disposed at a first position towards a left of a front center line of the cleaner body, and the second camera part is disposed at a symmetrical position towards a right of the front center line of the cleaner body.

7. The robot cleaner of claim 1, wherein the control unit is configured to detect a current position of the robot cleaner in a traveling area using images captured by the first and second camera parts.

8. The robot cleaner of claim 1, wherein the first and second camera parts are each rotatable to adjust an optical axis of a respective one of the first camera and the second camera.

9. The robot cleaner of claim 1, further comprising an ultrasonic sensing unit disposed on a front side surface of the bumper and configured to detect an obstacle located around a front of the cleaner body.

10. The robot cleaner of claim 9, wherein the ultrasonic sensing unit is disposed at a height lower than a sensing unit height.

11. The robot cleaner of claim 1, wherein the sensing unit is further configured to capture an image including a ceiling.

12. A robot cleaner comprising:
a cleaner body including a control unit for controlling autonomous driving;
a sensing unit disposed in an upper edge portion of the cleaner body, the sensing unit being inclined with respect to a side surface and an upper surface of the cleaner body;
an inclined part located on the upper edge portion of the cleaner body, the inclined part being downwardly inclined with respect to the upper surface of the cleaner body; and
a bumper disposed to cover at least part of a first half area of the cleaner body including the inclined part of the first half area of the cleaner body, the bumper being configured to be pressed and to absorb impact; and
a front camera located at a front of the cleaner body, the front camera configured to face forward so as to take images toward a front side of the cleaner body,
wherein a highest point of the bumper is located at a first height from a ground on which the robot cleaner travels, wherein the sensing unit is located at a position adjacent to a rear area of the bumper and located on the inclined part excluding a portion where the bumper is disposed on the cleaner body, wherein the sensing unit comprises a first camera part disposed in one side of the upper edge portion of the cleaner body at a first inclination and a second camera part disposed in another side of the upper edge portion of the cleaner body at a second inclination, wherein the sensing unit is located at a height equal to or less than the first height, and wherein an inclination of the sensing unit is smaller than an inclination of the inclined part.

13. The robot cleaner of claim 12, wherein the control unit detects a current position of the robot cleaner in a traveling area using images captured by the sensing unit.

14. The robot cleaner of claim 12, wherein the sensing unit is further configured to capture an image including a ceiling.

15. A robot cleaner comprising:
a cleaner body including a control unit configured to control autonomous driving;
a sensing unit disposed in a rear area of the cleaner body, wherein the sensing unit is directed upward, wherein the sensing unit is configured to capture images from a side direction and an upper direction, wherein the sensing unit is inclined with respect to a side surface and an upper surface of the cleaner body;
an inclined part located on the upper edge portion of the cleaner body, the inclined part being downwardly inclined with respect to the upper surface of the cleaner body;
a bumper disposed to cover at least part of a front area of the cleaner body including the inclined part of the front area of the cleaner body, the bumper being configured to be pressed and to absorb impact; and
a front camera located at a front of the cleaner body, the front camera configured to face forward so as to take images toward a front side of the cleaner body,
wherein a highest point of the bumper is located at a first height from a ground on which the robot cleaner travels,
wherein the sensing unit is disposed at a position adjacent to a rear of the bumper and located on the inclined part excluding a portion where the bumper is disposed on the cleaner body,
wherein the sensing unit comprises a first camera part disposed in one side of the upper edge portion of the cleaner body at a first inclination and a second camera part disposed in another side of the upper edge portion of the cleaner body at a second inclination,
wherein the sensing unit is disposed at a height equal to or less than the first height, and
wherein an inclination of the sensing unit is smaller than an inclination of the inclined part.

16. The robot cleaner of claim 15, wherein the control unit is configured to detect a current position of the robot cleaner in a traveling area using images captured by the sensing unit.

17. The robot cleaner of claim 15, wherein the inclined part comprises a through portion configured to allow the sensing unit to capture the images.

* * * * *